May 7, 1968 W. A. KEMP 3,381,382
PRINTER'S TRI-SQUARE
Filed July 25, 1967
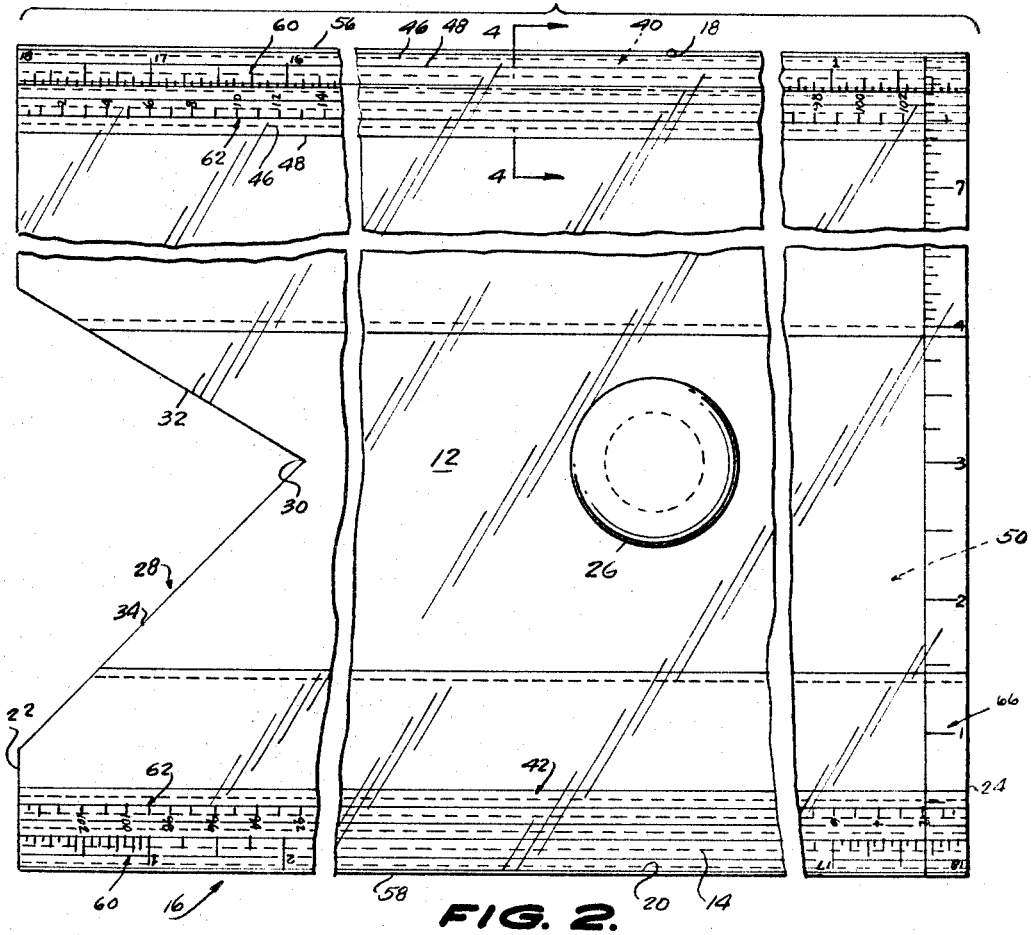
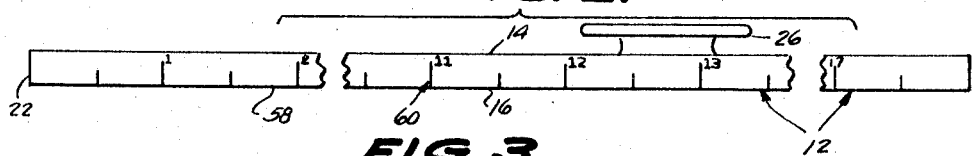
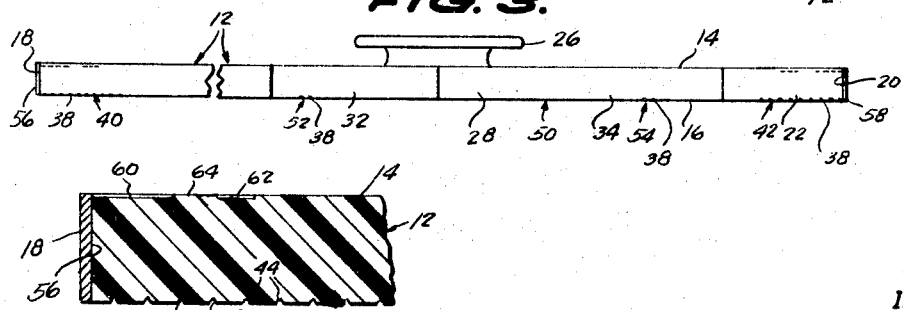
INVENTOR.
WILLIAM A. KEMP,
BY *Kimmel, Crowell & Weaver,*
ATTORNEYS.

United States Patent Office 3,381,382
Patented May 7, 1968

3,381,382
PRINTER'S TRI-SQUARE
William A. Kemp, Yuba City, Calif.
(2322 Lincoln St., Oroville, Calif. 95965)
Filed July 25, 1967, Ser. No. 655,933
2 Claims. (Cl. 33—104)

ABSTRACT OF THE DISCLOSURE

A transparent instrument or device for manual manipulation over a sheet of print for layout material, the instrument having grooves thereon spaced in accordance with printer's scales, the block being adapted to be superimposed on a sheet of printed matter and moved relative thereto to determine the alignment thereof and the size of type employed, the block having a plurality of rules formed thereon graduated in printer's measures and standard inch and fractions thereof, there being applied a steel rule to the opposed sides of the block to serve as guard means therefor, the instrument having at least one geometric figure cut therein and extending transversely therethrough to assist in layout work, and handle means fixedly connected to the instrument to facilitate the manipulation of the block.

Background of invention

This invention relates to the provision of an instrument having particular utility in the graphic arts. More specifically, this invention pertains to an instrument which is especially designed to provide an instrument for a printer or lithographer, as well as a stripper, and wherein the instrument combines in a unitary structure the functions of a plurality of instruments used in the graphic arts, each as a separate device.

One of the primary objects of this invention is to provide a person connected with the graphic arts with a device for quickly doing stripping or layout work and to check printed copy as to the straightness of the work, that is, to determine if the lines of printing are straight relative to the edges of the sheet.

Another object of this invention is to provide a device of the type described which may be used for scribing lines on film before stripping, and for use by draftsmen or other persons for doing ruled or layout work.

A still further object of this invention is to provide an instrument of the type generally described supra, the instrument being formed of a clear, preferably plastic material, and embossed or otherwise provided with scale indicia visible to the user when the instrument is superimposed on a sheet of printed material.

A still further object of this invention is to provide an instrument as described above wherein a pair of longitudinally extending opposed sides thereof are provided with steel rules as guard means against the possibility of cutting into the instrument when the user is engaged in a stripping operation and wherein the metal rules are graduated in accordance with desired scale or indicia.

It is a still further object of this invention to provide the above-described instrument with knob or handle means to facilitate the maneuverability of the device and to enable the user to place pressure thereon in order to prevent the film of copy disposed under the instrument from moving or slipping while the operator is engaging in a ruling or cutting operation.

This invention contemplates, as a further object thereof, the provision of an instrument or device of the type generally described supra, the instrument being noncomplex in construction and assembly, inexpensive to manufacture, and which is rugged and durable in use.

Other and further objects and advantages of the instant invention will become more manifest from a consideration of the following specification when read in light of the accompanying drawing.

Specification

In the drawing:

FIGURE 1 is a top plan view of a printer's tri-square constructed in accordance with this invention;

FIGURE 2 is a side edge elevational view of the instrument shown in FIGURE 1;

FIGURE 3 is an end edge elevational view of the instrument; and

FIGURE 4 is an enlarged detail cross-sectional view, FIGURE 4 being taken substantially on the vertical plane of line 4—4 of FIGURE 1, looking in the direction of the arrows.

Referring now more specifically to the drawing, reference numeral 10 designates a printer's tri-square constructed in accordance with the teachings of this invention. As is shown in the several figures of the drawing, the tri-square 10 is seen to comprise an elongated substantially rectangular block 12 formed of transparent plastic material, the block 12 being provided with vertically spaced substantially parallel and opposed planar sides 14, 16. The block 12 further includes a pair of elongated substantially rectangular laterally spaced and substantially parallel planar side edges 18, 20, and a pair of oppositely disposed transversely extending longitudinally spaced and substantially parallel rectangular and planar end edges 22, 24. Fixedly secured to the block 12 in an off-center relationship relative thereto is a knob or handle 26, the knob 26 projecting laterally from the planar side 14. As is seen in FIGURES 2 and 3, the knob 26 is provided with an axis which extends substantially perpendicular to the planar sides 14, 16.

The block 12 further includes a substantially V-shaped cutout 28 having its base opening into the planar edge 22 and its apex 30 spaced inwardly therefrom. The sides 32, 34 of the cutout 28 are planar and extend substantially perpendicular with respect to the opposed planar sides 14, 16, and as is seen in FIGURE 1 of the drawing, the side 32 intersects the planar end edge 22 at an angle of substantially 60° while the planar side 34 of the cutout 28 intersects the same end edge at an angle of substantially 45°.

Referring now more specifically to FIGURES 1, 3 and 4 of the drawing, it is seen that the planar side 16 has formed therein a plurality of elongated laterally spaced and substantially parallel grooves 38. The grooves 38 are arranged in a plurality of series or groups of which the first and second series thereof bear the reference numerals 40, 42, respectively. As is seen in FIGURE 1 of the drawing, the first series 40 of the grooves 38 is disposed adjacent the longitudinally extending side edge 18 and extend unbroken between the planar end edges 22, 24. The second series 42 of the grooves 38 are disposed adjacent the longitudinally extending planar side edge 20, and also extend unbroken between the planar end edges 22, 24.

The V-shaped grooves 38 may be formed in any suitable manner to provide longitudinally extending apices 44 spaced inwardly from the planar side 16. The apex 44 of each groove 38 is preferably of hairline thickness and is provided with a color, with the color of each adjacent pair of apices differing from one another. Preferably, the alternate apices 44 of each groove 38 are colored red and blue, although it will be understood that the selection of the coloring scheme is optional. In FIGURE 1 of the drawing, the hairline apices carrying one color are shown in dotted lines and bear the reference numeral 46 while the hairline apices of the grooves 38 carrying an alternate color are shown in continuous unbroken lines and bear the reference numeral 48.

The first and second series of grooves 40, 42 are separated from one another by a plateau 50 which extends from one planar end edge 22 to its opposed planar end edge 24. Disposed in the plateau 50 is a third series 52 of grooves 38 and a fourth series 54 of similar grooves 38, the series of grooves 52 and 54 being disposed, respectively, on opposite sides of the handle or knob 26. As is seen in FIGURES 2 and 3 of the drawing, the grooves 38 of the third and fourth series 52, 54 extend continuously from the end edge 24 to the planar sides 32, 34, respectively, of the V-shaped groove 28. The series 52, 54 of grooves 38 extend parallel to one another and parallel series 40, 42 of grooves 38 in laterally spaced relationship with respect there and relative to one another. The apices of the grooves 38 of the third and fourth series 52, 54 are hairlined as before and are alternately colored with differing colors corresponding to the colors of the apices 44 of the grooves 38 formed in the first and second series 40, 42 thereof.

Reference numerals 56, 58 each designate, respectively, metallic rules, preferably formed of steel, each rule 56, 58 having an elongated substantially rectangular configuration. Means are provided of a conventional nature to fixedly secure each of the rules 56, 58 to the opposed planar longitudinally extending side edges 18, 20. Each of the rules 56, 58 is provided with indicia 60 preferably marked in inches and fractions thereof.

The block 12 is further provided with pairs of scale indicia 60, 62. Each pair of scale indicia 60, 62 extends from one planar end edge 22 to the other one thereof 24 in laterally spaced and substantially parallel relationship relative to one another. As is seen in FIGURE 1 of the drawing, each pair of scale indicia 60, 62 is disposed in proximity to one of the longitudinally extending planar side edges 18, 20 and, as is seen in FIGURES 1 and 4, each pair of scale indicia 60, 62 is separated from the other by an intermediate longitudinally extending and substantially parallel panel 64. Preferably, the indicia 60 is marked in inches and fractions thereof while the indicia 60 is in accordance with the printer's measures.

Extending transversely of the block 12 and positioned adjacent the planar end edge 24 is further scale indicia carrying reference numeral 66. The scale indicia is here designated as being marked in inches and fractions thereof and extends between the longitudinally extending planar side edges 18, 20 in substantially perpendicular relationship relative thereto.

The indicia 66, as well as the indicia 60, 62 is formed in the upper side 14 of the block 12 but does not extend above the planar surface thereof. The indicia 60, 62 and 66 may be formed on the block 12 in any desirable manner such as, for example, the scale indicia may be printed on the block 12 or etched directly therein or otherwise embossed or impressed thereon. If it is found preferable to print the scale indicia, then the printed scales would be laminated in or between layers of plastic in order to prevent damage thereto. The grooves 38 may also be etched into the block 12 or otherwise formed so as to provide the hairline apices 44. With respect to the grooves 38, these lines are preferably scribed in the block 12 for 6, 8, 10, 12, 18, 24 and 36 point type.

Preferably the instrument or device 10 is dimensioned to have an 18 inch length, an 8 inch width, and a thickness of one-quarter of an inch although these dimensions are not critical.

The scales 60, 62 at each side of the block 12 are inscribed in reverse sequential order to facilitate the use of the tool 10 by left-handed persons and it is obvious that other scale indicia as shown in the drawing could be similarly arranged and disposed.

From the foregoing description of the instrument 10 its use by those skilled in the graphic arts is deemed obvious. However, and but mentioning briefly certain functions of the instrument 10, it is obvious that when the operator superimposes the block 12 over a sheet of printed matter, the colored hairline apices 44 of the grooves 38 may be compared against lines of type printed on the sheet on which the instrument 10 is superimposed to determine the straightness of the composition, and the size of the type employed. The cutout 28 finds utility in judging accuracy of layout and other types of work commonly found in the graphic arts and, of course, the printer's scales and inch scales disposed at the longitudinally extending marginal edges of the instrument 10 find their application in the usual manner.

Having described and illustrated one embodiment of this invention in detail, it will be understood that the same is offered merely by way of example, and that this invention is to be limited only by the scope of the appended claims.

What is claimed is:

1. A tri-square comprising
   a block formed of transparent material and having pairs of opposed planar sides, planar side edges and planar end edges, said side and end edges being disposed substantially perpendicular to said planar sides;
   said block having a first and second series of substantially V-shaped grooves formed therein extending inwardly from said one side thereof and being parallel, one with respect to the other, said first and second series of grooves being visible from the other side of said block, said grooves of said first and second series being laterally spaced from, respectively, one of said side edges and extending from one end edge to the other, said grooves of said first and second series each having an inwardly disposed colored apex, and a plateau interposed between said first and second series of grooves;
   said block having a substantially V-shaped cutout formed therein with the base thereof opening into one of said end edges and its apex located in said plateau in an off-center relationship relative to said block, said cutout being defined by opposed side walls extending perpendicular to the plane of said sides;
   third and fourth series of parallel V-shaped grooves formed in said one side of said block, said third and fourth series of grooves having inwardly disposed colored apices, and said third and fourth series of grooves extending from the other end edge to, respectively, one of said side walls of said cutout;
   handle means fixedly connected on said block and projecting laterally from the other side thereof, said handle means having an axis falling on a plane common to the apex of said cutout and perpendicular to said planar end edges; and
   said block having pairs of rules embossed on its other planar side, said pairs of embossed rules extending from one end edge to the other one thereof, and each pair of said rules being disposed adjacent, respectively, one of said side edges and confronting, respectively, the adjacent one of said first and second series of grooves.

2. A tri-square as defined in claim 1 and
   a metal rule fixedly secured to each planar side edge of said block.

(References on following page)

References Cited

UNITED STATES PATENTS

| | | | |
|---|---|---|---|
| 185,102 | 12/1876 | Hays | 33—107 |
| 713,141 | 11/1902 | Paschall | 33—107 |
| 1,154,673 | 9/1915 | Van Ness | 33—104 |
| 1,333,576 | 3/1920 | Rice | 33—107 |
| 1,732,906 | 10/1929 | Morton | 33—107 |
| 1,796,955 | 3/1931 | Morris | 33—111 |
| 1,840,568 | 1/1932 | Clark | 33—104 |

FOREIGN PATENTS

| | | |
|---|---|---|
| 251,090 | 4/1926 | Great Britain. |
| 276,205 | 8/1927 | Great Britain. |
| 195,987 | 7/1938 | Switzerland. |

HARRY N. HAROIAN, *Primary Examiner.*